Patented Feb. 10, 1953

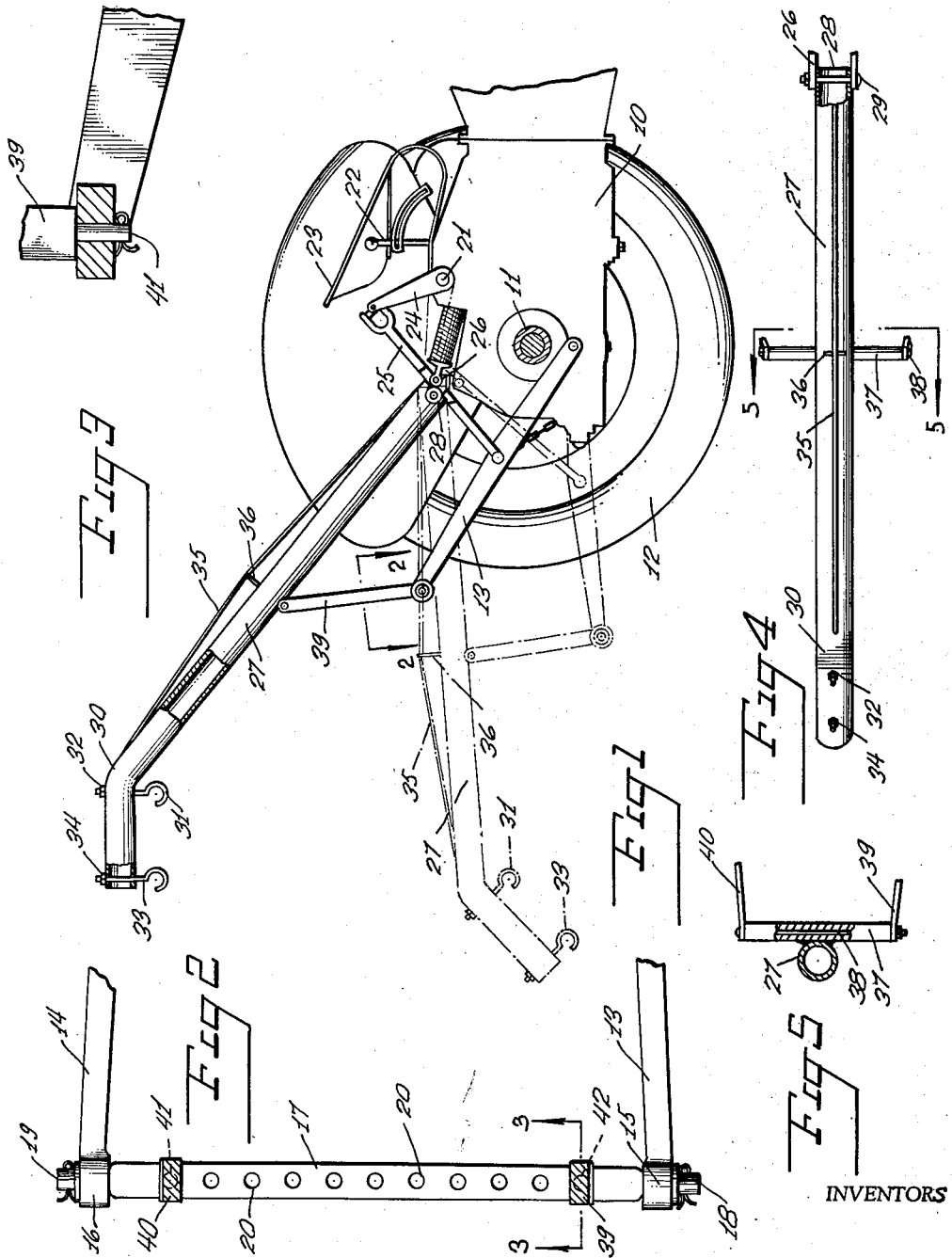

2,628,069

UNITED STATES PATENT OFFICE 2,628,069

LIFT ATTACHMENT FOR FARM TRACTORS

William R. Emery and Earnest Courtright,
Sheridan, Wyo.

Application October 18, 1949, Serial No. 122,094

2 Claims. (Cl. 254—124)

This invention relates to lift attachments for tractors, and more particularly to a lift boom attachable to a tractor and operated by the power-operated lift mechanism of the tractor.

It is among the objects of the invention to provide a hoist or boom of simplified construction which can be quickly mounted on a tractor equipped with power-operated implement lift mechanism for operation by such mechanism to lift heavy objects, such as logs, bales or boxes, which extends from the rear of the tractor and is supported by the large rear tractor wheels, and which is strong and durable in construction, economical to manufacture, and can be easily assembled on a tractor with no material modification of the tractor construction.

Other objects and advantages will become apparent from a consideration of the following description and the appended claims in conjunction with the accompanying drawing, wherein:

Figure 1 is a side elevation of a fragmentary rear portion of a farm tractor with a lift attachment illustrative of the invention operatively mounted thereon, one of the tractor rear wheels being removed and a portion of the lift mechanism being broken away and shown in cross-section to better illustrate the construction thereof;

Figure 2 is a transverse cross-section on an enlarged scale on the line 2—2 of Figure 1;

Figure 3 is a cross-section of a fragmentary portion of the lift attachment and tractor-lift mechanism taken on the line 3—3 of Figure 2;

Figure 4 is a top plan view of the lift attachment illustrated in Figure 1; and

Figure 5 is a transverse cross-section on the line 5—5 of Figure 4.

With continued reference to the drawing, the tractor illustrated is of the Ford-Ferguson, Ford or Ferguson type and has a transmission and differential unit 10 supported on a rear axle 11, the opposite ends of which are carried by the tractor rear wheels, one of which is shown in Figure 1 and indicated at 12.

A pair of tension links 13 and 14 is pivotally secured at their front ends to the tractor differential unit 10 at respectively-opposite sides of the unit and immediately below the rear axle 11. These links extend rearwardly of the tractor in spaced-apart, somewhat diverging relationship and are provided at their rear ends with apertured bosses 15 and 16. A drawbar 17 is provided, at its opposite ends, with reduced, cylindrical arbors 18 and 19 journaled in the bosses 15 and 16, respectively, and this drawbar is provided with a series of spaced-apart holes or apertures 20 extending longitudinally thereof. A lift shaft 21 is journaled in the transmission and differential unit 10 at the top of the latter and extends transversely of this unit above and slightly forwardly of the rear axle 11. Hydraulic power means operated by the tractor engine is operatively connected to this shaft to rotate the shaft under the control of a manually-operated lever 22 positioned near the tractor seat 23 and connected to a hydraulic valve, not illustrated, for causing the shaft 21 to rotate in either direction at the will of the operator of the tractor. A pair of lift arms, one of which is illustrated in Figure 1 and indicated at 24, is secured to the shaft 21 at respectively-opposite ends of the latter, and a pair of struts, one of which is indicated at 25 in Figure 1, respectively connects the lift arms 24 to the links 13 and 14 for raising and lowering these links.

An apertured lug 26 is mounted on the top of the unit 10 at the rear end of the latter above the rear axle 11 and above the pivotal connections between the front ends of the links 13 and 14 and the tractor transmission and differential unit.

The lift attachment includes an elongated boom 27 having at one end a lug formation 28 which is received between the two parts of the lug 26 and secured to the lug 26 by a bolt 29 extending through the apertures in the lug portions 26 and through an aperture in the lug formation 28 on the forward end of the boom 27. While the boom 27 may be of any desired structural shape, a tubular, substantially cylindrical boom has been found to give excellent results in practice.

At a location near its rear end the boom 27 is provided with an angular bend 30, and a hook 31 extends through the boom just to the rear of this bend 30 and depends from the boom, being secured to the boom by suitable means, such as the nut 32 threaded onto the shank of the hook and resting upon the upper surface of the boom.

A second hook 33 is secured to the boom at the rear end of the latter and is supported in depending relationship by a nut 34 threaded onto the shank of the hook and resting upon the top surface of the boom. A tension rod 35 extends along the upper surface of the boom between the front end of the boom and the bend 30 and is secured at its ends to the boom. A bridge 36 is interposed between the boom and the rod 35 substantially at the mid-length location of the rod to tension the rod and provide a stiffening truss for the tubular boom.

A tubular member 37 is secured substantially at its mid-length location to the under side of the boom 27 intermediate the length of the boom, so that it extends to opposite sides of the boom substantially at right angles thereto. An elongated bolt 38 extends through and is journaled in the member 37, and a pair of legs 39 and 40 is provided near their upper ends with apertures which receive the bolt 38 at respectively-opposite ends of the latter. At their lower ends these legs 39 and 40 are provided with reduced extensions constituting pins 41 and 42 which are received respectively in the end apertures of the series of apertures 20 in the drawbar 17. These legs 39 and 40 transmit lift forces from the links 13 and 14 to the boom 27, so that the boom will be raised and lowered when the links 13 and 14 are raised and lowered by the lift shaft 21 acting through the arms 24 and struts 25.

The boom is movable between a lowered position, as indicated in broken lines in Figure 1, and an elevated or uppermost position, as illustrated in full lines in the same figure, and is effective to lift heavy objects by suspending such objects from the hooks 31 and 33.

The attachment of the lift attachment to the tractor does not require any modification of the tractor construction, as all of the tractor parts used to operate the lift attachment are provided as standard equipment on the tractor, and the operation of the boom does not interfere with the operation of the tractor as the tractor can be moved forwardly or rearwardly, as may be desired, with an object suspended from the boom.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a tractor having a pair of links pivotally connected at their front ends to the tractor at the rear end of the latter and extending rearwardly from the tractor, a power-operated lift shaft journaled in the tractor above the front ends of said links and extending transversely of the tractor, a lift arm on each end of said lift shaft, struts respectively connecting said filt arms to said links to raise and lower the latter, and an apertured lug mounted on said tractor to the rear of said lift shaft, a lift attachment comprising an elongated boom, means pivotally connecting said boom at its forward end to said lug, a member secured to said boom intermediate the length of the latter and extending to opposite sides of said boom substantially at right angles thereto, legs extending respectively between the opposite ends of said member and said links to transmit lift forces from said links to said boom, means pivotally connecting said legs to said member and said links, and a hook secured to and depending from said boom near the rear end of the latter.

2. In combination with a tractor having a pair of links pivotally connected at their front ends to the tractor at the rear end of the latter and extending rearwardly from the tractor, a power-operated lift shaft journaled in the tractor above the front ends of said links and extending transversely of the tractor, a lift arm on each end of said lift shaft, struts respectively connecting said lift arms to said links to raise and lower the latter, and an apertured lug mounted on said tractor to the rear of said lift shaft, a lift attachment comprising an elongated tubular boom, means pivotally connecting said boom at its front end to said lug, a hook secured to and depending from said boom at the rear end thereof, a tubular member secured to the under side of said boom intermediate the length of the latter and extending to opposite sides of said boom substantially at right angles thereto, a pair of legs having apertures near their upper ends and disposed at respectively-opposite sides of said tubular member, a bolt extending through said tubular member and said legs pivotally connecting said legs to said boom, and means connecting said legs at their opposite ends respectively to said links to transmit lift forces between said links and said boom.

WILLIAM R. EMERY.
EARNEST COURTRIGHT.

REFERENCES CITED

The following references are of record in the file of this patent:

UNITED STATES PATENTS

| Number | Name | Date |
| --- | --- | --- |
| 1,558,636 | Rutan | Oct. 27, 1925 |
| 1,873,433 | Larsen | Aug. 23, 1932 |
| 2,341,807 | Olmstead et al. | Feb. 15, 1944 |
| 2,398,585 | Hayward | Apr. 16, 1946 |
| 2,453,723 | Palmer et al. | Nov. 16, 1948 |
| 2,471,152 | Griffin | May 24, 1949 |
| 2,502,108 | Taylor | Mar. 28, 1950 |